United States Patent Office 2,780,483
Patented Feb. 5, 1957

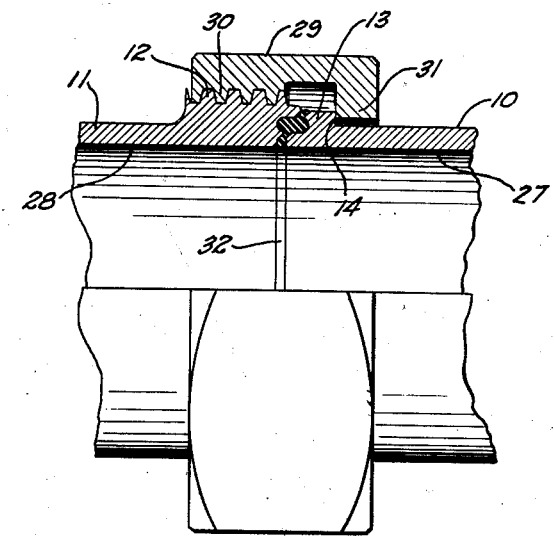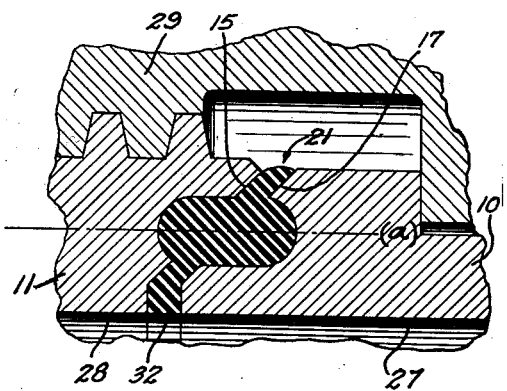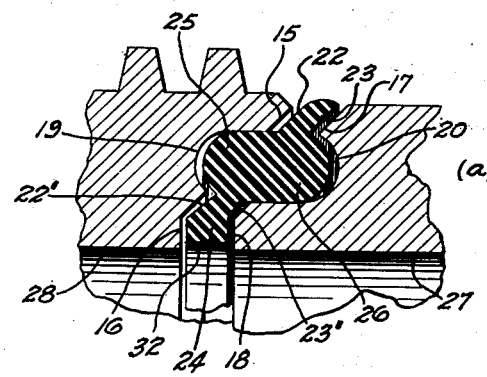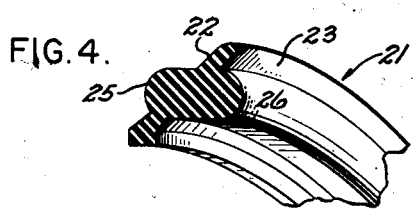

2,780,483

SEALED JOINT FOR PIPES HAVING CONICAL TAPERED INTERFACES

Joseph S. Kessler, Kenosha, Wis., assignor, by mesne assignments, to Ladish Co., Cudahy, Wis., a corporation of Wisconsin Application March 30, 1953, Serial No. 345,528

3 Claims. (Cl. 285—332)

This invention relates to improvements in sealed joints, and more particularly to joints for sanitary piping systems.

In dairy and other food handling industries where sanitary piping installations are utilized, the trend is away from that type of piping system which must be disassembled for daily cleaning. Experience has shown that there is less bacterial action in semi-permanent installations of a type which can be cleaned in place by pumping detergent solutions therethrough. However, to accomplish thorough cleaning when circulating a detergent, the joints of the piping system must present a substantially smooth inner surface.

The joints of many existing piping systems have complementary male and female fittings with frusto-conical sealing surfaces which are held in engagement by a union nut or other suitable device. This type of joint, however, does not present a sufficiently smooth internal surface to be thoroughly cleaned when a detergent is pumped therethrough, and for this reason it is not safe to use a system of this type on a semi-permanent basis.

With the above in mind it is a principal object of the present invention to provide an improved sealed joint which presents a smooth internal surface and which is therefore well adapted for use in a semi-permanent sanitary piping installation.

A further object of the invention is to provide an improved sealed joint of the class described which can be produced by modification of existing tapered fittings, thereby making possible the conversion of existing disconnectable piping installations to a semi-permanent type.

A more specific object of the invention is to provide an improved sealed joint of the class described wherein the obliquely extending annular sealing surfaces of the male and female fittings are provided with registering grooves which extend axially into the oblique sealing surfaces, there being a sealing gasket of novel construction sealingly engageable with said sealing surfaces and having beads or ribs projecting from opposite sides and fitting said grooves.

A further specific object of the invention is to provide an improved sealed joint of the class described in which the annular end faces of the fittings have cooperating flat inner marginal surface portions normal to the axes of said fittings, and wherein the sealing gasket is formed with an inner marginal web portion which is normally compressed between said surface portions, said web portion having an annular edge which is flush with the internal surfaces of said fittings, when compressed in assembly, and which has a diameter larger than the internal diameter of said fittings when it is uncompressed.

A further object of the invention is to provide an improved joint of the class described, the parts of which can be readily assembled by straight axial movement, the improved gasket being supportable during such assembly on either the male or the female fitting of said joint without being manually held in place.

With the above and other objects in view, the invention consists of the improved sealed joint and all of its parts and combinations, as set forth in the claims, and all equivalents thereof.

In the drawing accompanying and forming a part of this specification, wherein one complete embodiment of the preferred form of the invention is shown, and wherein like characters of reference indicate the same parts in all of the views:

Fig. 1 is a fragmentary side elevational view showing a pair of tubes connected by the improved sealed joint, parts being broken away and shown in longitudinal section;

Fig. 2 is an enlarged, fragmentary, longitudinal sectional view of a portion of the improved joint before the parts are placed in axial compression by tightening of the union nut;

Fig. 3 is a view similar to Fig. 2, showing a portion of the union nut in clamping position and showing the seal in clamped sealing condition; and Fig. 4 is a fragmentary perspective view of the resilient sealing gasket.

Referring more particularly to Fig. 1, the numerals 10 and 11 designate metal tube ends, the end of one tube being enlarged and externally threaded as at 12, and the end of the other tube having a relatively narrow annular enlargement 13 which provides a shoulder 14 between the enlargement and the main portion of the tube 10. The fitting 11 has the cross section of its end face extending in a generally oblique, outwardly flared direction as at 15. Near the interior of the tube, however, the oblique face portion meets a short annular portion 16 which is normal to the axis of the tube.

The cross section of the end face of the tube 10 extends in a generally oblique direction as at 17 to match the oblique portion 15 of the end face of the cooperating tube. Near the interior of the tube, however, the oblique portion 17 meets a relatively short annular face portion 18 which is normal to the axis of the tubes.

Intermediate the length of the obliquely extending face portion 15 is an annular groove 19 which is cut in an axial direction into the end face. Intermediate the length of the oblique face 17 of the tube 10 is a cooperating annular groove 20 which is cut in an axial direction into the face 17. The axial direction of cut of the grooves is indicated by the dot and dash line (a) of Fig. 3.

An annular sealing gasket 21, of synthetic rubber made by the polymerization of chloroprene, such as neoprene or a butadiene copolymer, or other suitable relatively hard but resilient material is normally positioned between the end faces 15 and 17. This sealing gasket is generally frusto-conical in shape and has a generally obliquely extending face 22 on one side which substantially matches the taper of the face 15 of the tube 11. It has a generally obliquely extending face 23 on the other side which generally matches the obliquely extending face 17 of the tube 10. Near the outer periphery of the gasket the faces 22 and 23 are parallel to one another. Near the inner periphery of the gasket the oblique face portions 22' and 23' are somewhat flared to be wedge shaped in cross section, as shown in Figs. 2 and 4. These surfaces 22' and 23' join an annular portion 24 near the inner periphery of the gasket which has sides extending in a direction normal to the axis of the gasket and normal to the axis of the tubes 10 and 11. This annular gasket portion 24 is located between the annular faces 16 and 18 of the tube.

The gasket also has oppositely projecting annular beads 25 and 26, which beads project in a direction axially of the tube (as indicated at (a)—(a) in Fig. 3) and are of a size to snugly fit the grooves 19 and 20. It is to be noted from Fig. 2 that before the gasket is in final position the inner marginal edge 32 of the portion 24 is short of a condition of alinement with the bores 27 and 28 of the tubes 10 and 11.

While the improved joint may be held in assembled condition by any suitable means, it is common for this type of joint to include a union nut 29 having threading 30 which is cooperable with the threading 12 on the tube 11, and having an inwardly projecting annular flange 31 for cooperation with the shoulder 14 on the tube 10.

When the union nut is tightened, as in Figs. 1 and 3, the rib portions 25 and 26 of the gasket are forced in axial directions into the grooves 19 and 20 to snugly fit therein. The flared faces 22' and 23' are compressed by parallel face portions of the tube ends to squeeze the sides 22' and 23' of the gasket into parallelism and to thin out the annular portion 24 of the gasket. This squeezing and thinning out under compression causes the inner marginal edge 32 of the gasket to flow to a final position which is exactly flush with the bore portions 27 and 28 of the tubes. Due to this compressing action on the faces 22' and 23' of the gasket, and on the faces of the gasket portion 24, the tightest sealing action takes place near the interior of the tube so that a perfectly tight joint is insured. Furthermore, by working out the parts so that the inner marginal edge 32 of the gasket is flush with the bores of the tubes, no unsanitary pocket is created at the joint. It is therefore entirely practical to use this type of joint in a semi-permanent installation where cleaning is performed by pumping of a detergent through the system. It is to be noted that a minimum amount of sealing material is exposed to the fluid which is to flow through the conduit.

When it is necessary to disconnect the fittings this may, of course, be done easily and quickly. Assembly is also simple because the rib on one side of the gasket can be pressed manually into its groove on one of the pipe ends. Inasmuch as this is a snug fit it will serve to hold the gasket in exactly the right position while the union nut is being tightened so that a perfect final sealing relationship as illustrated in Fig. 3 is insured.

Various changes and modifications may be made without departing from the spirit of the invention, and all of such changes are contemplated, as may come within the scope of the claims.

What I claim as new is:

1. A joint construction comprising male and female coaxial tubular members of like internal diameter, the female member having an annular end face portion which in cross section extends in a generally oblique direction with respect to the axis of the tubular member and which has an inner portion meeting said obliquely extending portion and extending in a direction normal to the axis of the tubular members, the male member having an annular end face a portion of which in cross section extends in an oblique direction to match the oblique portion of the female member and an inner portion of which extends in a direction normal to the axis of the tubular member to match the corresponding portion of the end face of the female member, the oblique face portion of at least one of said male and female members having an annular groove extending therein in a direction parallel to the axis of the tubular members, an annular resilient sealing gasket interposed coaxially between said end faces, said gasket having a relatively thin web portion which is frusto-conical and which in cross section extends in a generally oblique direction to coincide with the obliquely extending portions of the male and female members, and said gasket having an annular rib which projects in a direction parallel to the axis of the tubular members from the gasket and which is in said annular groove and adapted to be entered therein by movement of the entire gasket in an axial direction, said gasket having a relatively thin inner portion which is in a plane normal to the axis of the tubular members and of substantially less width than the rib in an axial direction, the part of the frusto-conical web portion which connects said last-mentioned inner portion with said rib being wedge-shaped in cross section, the gasket having an inner marginal edge which is normally of greater diameter than the internal diameters of the tubular members, said marginal edge diameter being such with respect to the nature of the material of the gasket that the gasket is deformed inwardly a sufficient amount to cause said inner marginal edge to be flush with the internal walls of the tubular members after the gasket is under compression in an assembled joint.

2. A joint construction comprising male and female coaxial tubular members of like internal diameter, the female member having an annular end face portion which in cross section extends in a generally oblique direction with respect to the axis of the tubular member and which has an inner portion meeting said obliquely extending portion and extending in a direction normal to the axis of the tubular members, the male member having an annular end face a portion of which in cross section extends in an oblique direction to match the oblique portion of the female member and an inner portion of which extends in a direction normal to the axis of the tubular member to match the corresponding portion of the end face of the female member, the oblique face portion of said male member having an annular groove extending therein in a direction parallel to the axis of the tubular members, the oblique face portion of said female member also having an annular groove extending therein in a direction parallel to the axis of the tubular members, an annular resilient sealing gasket interposed coaxially between said end faces, said gasket having a relatively thin web portion which is frusto-conical and which in cross section extends in a generally oblique direction to coincide with the obliquely extending portions of the male and female members, said gasket having an annular rib which projects from both sides of the web portion of the gasket in a direction parallel to the axis of the tubular members and which is in said annular grooves and adapted to be entered therein by movement of the entire gasket in an axial direction, said gasket having a relatively thin inner portion which is in a plane normal to the axis of the tubular members and of substantially less width than the rib in an axial direction, the part of the frusto-conical web portion which connects said last-mentioned inner portion with said rib being wedge-shaped in cross section, the gasket having an inner marginal edge which is normally of greater diameter than the internal diameters of the tubular members, said marginal edge diameter being such with respect to the nature of the material of the gasket that the gasket is deformed inwardly a sufficient amount to cause said inner marginal edge to be flush with the internal walls of the tubular members after the gasket is under compression in an assembled joint.

3. A joint construction comprising male and female coaxial tubular members of like internal diameter, the female member having an annular end face portion which in cross section extends in a generally oblique direction with respect to the axis of the tubular member and which has an inner portion meeting said obliquely extending portion and extending in a direction normal to the axis of the tubular members, the male member having an annular end face a portion of which in cross section extends in an oblique direction to match the oblique portion of the female member and an inner portion of which extends in a direction normal to the axis of the tubular member to match the corresponding portion of the end face of the female member, the oblique face portion of at least one of said male and female members having an annular groove extending therein in a direction parallel to the axis of the tubular members, said groove having a rounded bottom, an annular resilient sealing gasket interposed coaxially between said end faces, said gasket having a relatively thin web portion which is frusto-conical and which in cross section extends in a generally oblique direction to coincide with the obliquely extending portions of the male and female members, and said gasket having an annular rib which projects in a direction parallel to the axis of the tubular members from the gasket and which is in said annular groove and adapted to be entered therein by movement of the entire gasket in an axial direction, said gasket having a relatively thin inner portion which is in a plane normal to the axis of the tubular members and of substantially less width than said rib in an axial direction, the part of the frusto-conical web portion which connects said last-mentioned inner portion with said rib being wedge-shaped in cross section, the gasket having an inner marginal edge which is normally of greater diameter than the internal diameters of the tubular members, said marginal edge diameter being such with respect to the nature of the material of the gasket that the gasket is deformed inwardly a sufficient amount to cause said inner marginal edge to be flush with the internal walls of the tubular members after the gasket is under compression in an assembled joint.

References Cited in the file of this patent

UNITED STATES PATENTS

| | | |
|---|---|---|
| 75,151 | Gould | Mar. 3, 1868 |
| 101,488 | Mendham | Apr. 5, 1870 |
| 1,615,595 | O'Connor | Jan. 25, 1927 |
| 2,523,995 | Parmesan | Sept. 26, 1950 |

FOREIGN PATENTS

| | | |
|---|---|---|
| 364,375 | Great Britain | Jan. 7, 1932 |
| 559,966 | France | June 27, 1923 |